US010229208B2

(12) United States Patent
Hopkins et al.

(10) Patent No.: US 10,229,208 B2
(45) Date of Patent: Mar. 12, 2019

(54) OPTIMIZATION OF QUERY EXECUTION (71) Applicant: Facebook, Inc., Menlo Park, CA (US)

(72) Inventors: Kendall Blair Hopkins, Sunnyvale, CA (US); James M. Wilson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 657 days.

(21) Appl. No.: 14/444,676

(22) Filed: Jul. 28, 2014

(65) Prior Publication Data

US 2016/0026718 A1   Jan. 28, 2016

(51) Int. Cl.
*G06F 17/30* (2006.01)
(52) U.S. Cl.
CPC .. *G06F 17/30867* (2013.01); *G06F 17/30445* (2013.01); *G06F 17/30477* (2013.01)
(58) Field of Classification Search
None
See application file for complete search history.

(56) References Cited

U.S. PATENT DOCUMENTS

| 5,742,806 | A  | * | 4/1998  | Reiner   | G06F 17/30445 |
| 5,983,228 | A  | * | 11/1999 | Kobayashi| G06F 17/30342 |
| 7,657,515 | B1 | * | 2/2010  | Jewell   | G06F 17/3066 |
|           |    |   |         |          | 707/999.003 |
| 7,945,581 | B2 | * | 5/2011  | Bayliss  | G06F 17/30445 |
|           |    |   |         |          | 707/770 |
| 2004/0098359 | A1 | * | 5/2004 | Bayliss | G06F 17/30445 |
| 2005/0044064 | A1 | * | 2/2005 | Haase | G06F 17/30448 |
| 2006/0048024 | A1 | * | 3/2006 | Lidin | G01R 31/31813 |
|              |    |   |        |       | 714/724 |
| 2007/0073651 | A1 | * | 3/2007 | Imielinski | G06F 17/30386 |
| 2008/0059408 | A1 | * | 3/2008 | Barsness | G06F 17/30545 |
| 2009/0132609 | A1 | * | 5/2009 | Barsness | G06F 17/30445 |
| 2009/0225076 | A1 | * | 9/2009 | Vlietinck | G06T 15/005 |
|              |    |   |        |       | 345/419 |
| 2010/0094893 | A1 | * | 4/2010 | Dettinger | G06F 17/30395 |
|              |    |   |        |       | 707/764 |
| 2010/0205323 | A1 | * | 8/2010 | Barsness | G06F 17/30477 |
|              |    |   |        |       | 709/248 |
| 2013/0124552 | A1 | * | 5/2013 | Stevenson | G06F 17/30864 |
|              |    |   |        |       | 707/759 |
| 2014/0201223 | A1 | * | 7/2014 | Fondekar | G06F 17/30657 |
|              |    |   |        |       | 707/755 |
| 2016/0019249 | A1 | * | 1/2016 | Gunjan | G06F 17/30333 |
|              |    |   |        |       | 707/715 |

* cited by examiner

*Primary Examiner* — Bai D Vu
(74) *Attorney, Agent, or Firm* — Baker Botts L.L.P.

(57) ABSTRACT

Various embodiments are disclosed for optimizing the execution of a query to retrieve data associated with multiple entities from a database server system, where the entities are associated with a user of a social networking system. At least one embodiment includes analyzing parameters of the query to identify one or more databases at which to execute the query, determining whether to execute constraint type parameters on the data retrieved at a frontend or backend server of the server system, and separating the performance of privacy checks on the data retrieved from the execution of the query. The embodiment further includes executing, based on the databases identified, the query in parallel threads to retrieve individual data sets of a result set, where a particular individual data set is associated with a particular entity.

18 Claims, 6 Drawing Sheets

OPTIMIZATION OF QUERY EXECUTION

BACKGROUND

Various websites and application systems enable users to view user-created content, where such content is often protected under privacy settings. For example, a social networking application system enables each of its users to set a privacy setting for almost every "entity" relating to the application system and to adjust the setting at any time. Example entities are photos, videos, status updates, wall posts, timeline, etc. A particular user can view any information related to entities of other users on the social networking system, as long as the privacy settings of those other users allow such viewing. The particular user can also request the information to be filtered, sorted, or organized according to a constraint (e.g., most recent). The information is generally retrieved from one or more databases of the social networking system. However, retrieving the information in compliance with the privacy settings and the various constraints can consume significant computing resources and cause a significant delay to system performance.

The queries to retrieve only the compliant information typically involve multiple back-and-forth operations, or "hops," between a frontend server (e.g., web server) and a backend server (e.g., database server) of the social networking system. In particular, portions of the information are retrieved from one or more databases of the backend server and are returned to the frontend server for a privacy check. The frontend server stores the associated privacy settings for the portions of information and defines and/or evaluates the privacy settings for each portion being retrieved. Once all of the photos are fetched and the privacy settings for those photos are checked, the frontend server may then apply the requested constraint(s) (e.g., sort all of the friends' privacy-compliant photos according to most recent and remove old photos before returning them).

The network hops between the frontend and backend servers can consume a significant amount of time and computing resources, especially if the structure or the design of the one or more databases is not efficient for a particular type of query. Further, in an example where a large number of photos are removed from the result set, e.g., for not being recent, a substantial amount of the computing resources is wasted in the back-and-forth network hops executed to retrieve all of the photos.

BRIEF DESCRIPTION OF THE DRAWINGS

FIG. 2 which includes FIGS. 2A and 2B, is a block diagram illustrating example components of a frontend server and a backend server, respectively.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Introduced here are embodiments for optimizing execution of a database query. Various embodiments utilize a declarative language to specify an input query for retrieving data from a large set of data at one or more database servers ("backend servers"). The query parameters specified by the declarative language are first analyzed to identify a mapping of values associated with the query parameters. A database having an index that corresponds to the mapping is then identified. Execution of the query at the identified database returns a reduced set of data for further evaluation by one or more web servers ("frontend servers"). The reduced set of data undergoes a privacy check at the frontend servers, where the privacy checks are applied subsequent to execution of the query parameters. At least some embodiments identify one or more data threads associated with the query parameters and execute the query parameters and privacy checks for data threads in parallel, where individual reduced data sets associated with the threads can be returned independently of each other.

The embodiments reduce the number of hops between the backend servers and the frontend servers by separating the privacy checks from the data retrievals, thereby consuming less computing resources (e.g., memory, CPU, etc.) and making the query execution more efficient. Moreover, the data retrievals can be executed at one database (as opposed to multiple databases) that contains data mapped out according to the query parameter values, thereby significantly reducing the amount of time for the data retrievals. Furthermore, since the data retrievals can be executed for multiple data threads in parallel, the embodiments enable individual data sets to be returned as soon as they become available. The optimization of the query execution can be carried out without any prerequisite knowledge by a developer inputting the query, as long as the developer specifies the query parameters in a declarative language.

The disclosed embodiments can be implemented to improve the performance of applications or services that experience high volumes of queries per second, where each query can involve numerous complex privacy checks on data. One example of such a service is a "newsfeed" service in social networking systems. The newsfeed service identifies recent stories by various users (e.g., friends) for display on a viewer's landing page and performs a privacy check on each identified story to determine if the story should be included or excluded for viewing by the viewer. Examples of stories include comments, "likes," etc., and objects such as statuses, photos, "shares," "check-ins," etc.

Another example of a service in which the embodiments can be applied is a "timeline" service that displays a user profile comprising a collection of stories in a chronological order in social networking systems. Any request from a viewer to view data items associated with a user's timeline involves a privacy check of each data item to ensure that the viewer can see only those items that pass the privacy check. For example, if a user's photo has a privacy value "friends," the privacy check can determine whether the viewer is: (1) a "friend" of the user, (2) tagged on the photo, or (3) friend of the tagged user. If any of these conditions is true, the photo passes the privacy check and can be displayed to the viewer. Otherwise, the photo may be prevented from being displayed.

Various embodiments will now be described in further detail with reference to the figures. The following description provides specific details for a thorough understanding and an enabling description of these implementations. One skilled in the art will understand, however, that the disclosed systems and methods of the various embodiments may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed systems and methods.

Figure 1:
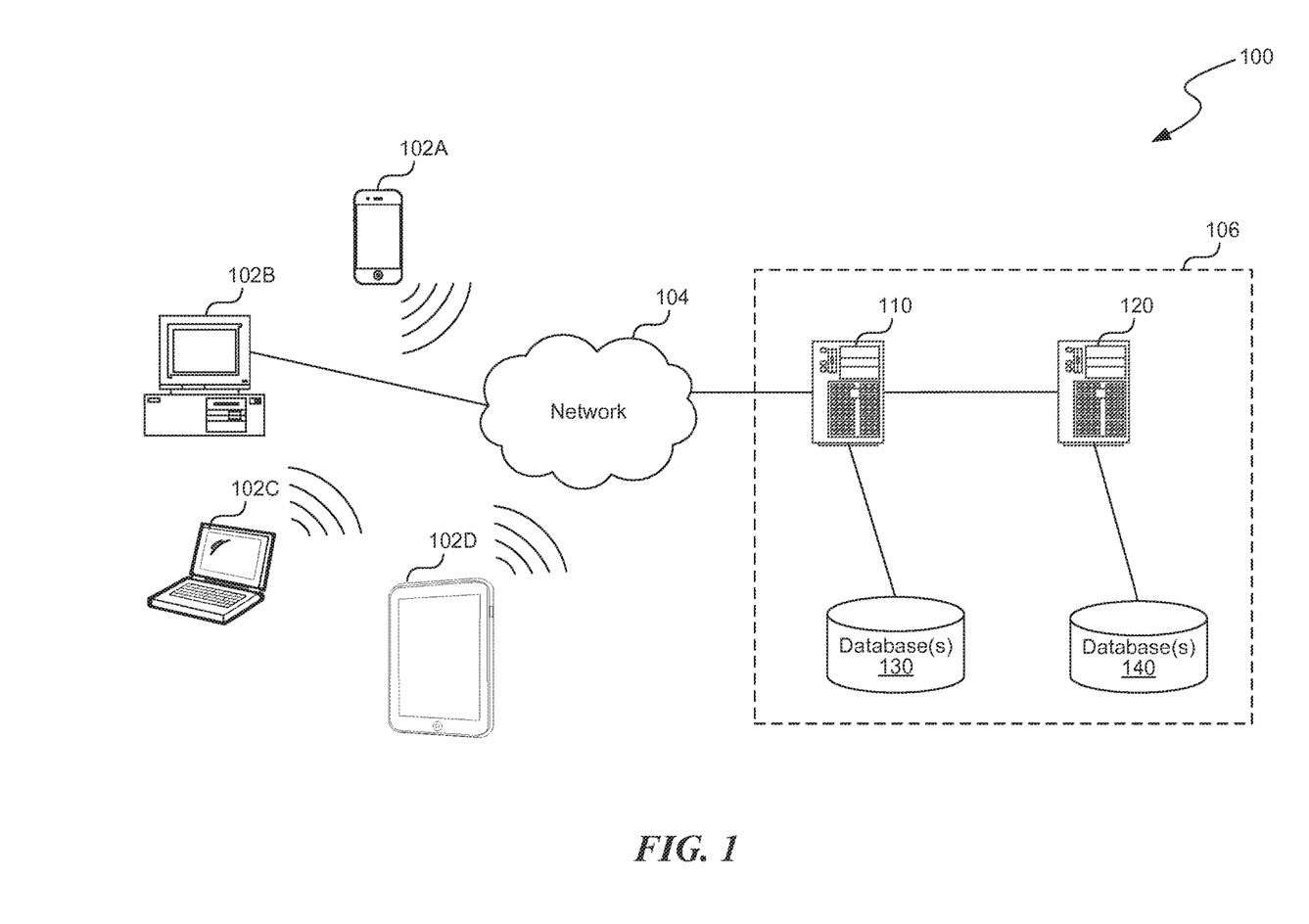
FIG. 1 is an environment in which one or more disclosed embodiments may be executed.

FIG. 1 illustrates an environment 100 that includes a social networking system 106 with which some embodiments may be utilized. The environment 100 includes one or more user devices 102A-102D interacting with the social networking system 106 over a network 104. The network 104 can be a local area network (LAN) or a wide area network (WAN), but may also be other wired or wireless networks. The user devices 102A-102D can be connected to the network 104 through a network interface, such as by a wired or wireless network. In other embodiments, the environment 100 can include different, fewer, and/or additional components for various applications than those shown in FIG. 1. Conventional components such as network interfaces, security mechanisms, load balancers, failover servers, management and network operations consoles, and the like are not shown so as to not obscure the details of the system architecture.

The social networking system 106 includes a frontend server 110 and a backend server 120 connected to one another over the network 104. The frontend server 110 includes one or more remote computers or server computing devices, which facilitate execution of privacy checks and storage of the privacy policies and rules for the privacy checks. The frontend server 110 is associated with one or more databases 130 that can include one or more database tables storing information, such as the privacy policies and rules. The backend server 120 includes one or more database servers, which facilitate storage and retrieval of. The backend server 120 is associated with one or more databases 140, which can include one or more database tables storing information, such as the data about the users, entities, connections, and associated social graphs.

In various embodiments, the architecture of the backend server 120 may be different. For example, the backend server 120 for a newsfeed service can include multiple leaf servers where data items are stored and one or more retrieval servers that perform the retrieval of data items from the multiple leaf servers. In another example, the backend server 120 for a timeline service can include one or more databases where data items relating to the service are stored and one or more retrieval servers that retrieve the data items from the one or more databases. As described above, each of the frontend server 215 and the backend server 225 can be coupled to one or more databases. In yet another example, the backend server 120 for a search engine can include a search tier comprising multiple index servers and one or more retrieval servers that issue a query and retrieve responses to the query.

The user devices 102A-102D can allow users of the social networking system 106 to access content of other users (e.g., photos, statuses, newsfeed, etc.) using logical connections to the frontend server 110 over the network 104. The user devices 102A-102D can be any computing devices capable of receiving user input as well as transmitting and/or receiving data via the network 104. The user devices 102A-102D can include a conventional computer system, such as a desktop or a laptop computer, a mobile computing device, such as a personal digital assistant (PDA) or a tablet, a mobile telephone, such as a smart-phone, and the like. In one embodiment, a particular user device 102 executes an application allowing a user to interact with the social networking system 106. For example, the user device 102 executes a browser application to enable interaction between the user device 102 and the social networking system 106 via the network 104. In another embodiment, the user device 102 interacts with the social networking system 106 through an application programming interface (API) that runs on the native operating system of the user device 102, such as iOS® or ANDROID®.

In use, the social networking system 106 allows its users to interact with each other as well as with other entities maintained by the social networking system 106. Users can use, e.g., the user devices 102, to join the social networking system 106 and add connections to other users or entities of the social networking system to which they desire to be connected. The users of the social networking system 106 may be individuals or businesses, organizations, universities, manufacturers. The frontend server 110 and the backend server 120 of the social networking system 106 work in coordination to store user profiles associated with the users and/or other entities, as well as connections between the users and other users and/or entities. The entities include, for example, photos, videos, statuses, wall posts, timeline, etc.

Based on stored data about the users, entities, and connections between the users and/or the objects, the social networking system 106 can generate and maintain a "social graph" that includes multiple nodes interconnected by multiple edges. The social graph can be stored at one or more databases of the database server 120. Each node in the social graph represents an entity or user that can act on another node and/or that can be acted on by another node. An edge between two nodes in the social graph represents a particular kind of connection, or association, between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 106 modifies edges connecting the various nodes to reflect the interactions.

The social graph information stored in the databases can be accessed by users other than the users of the social networking system 106, such as developers working on the social networking system 106. Such "developer" users can utilize the social graph information by submitting various queries to retrieve data from the databases of the backend server 120.

It should be noted that the term "server" as used throughout this description refers generally to a computer, other device, program, or combination thereof that processes and responds to the requests (e.g., from remote users using client devices across a network, from other servers). Servers serve their information to requesting "clients." The term "client" as used herein refers generally to a computer, program, other device, user and/or combination thereof that is capable of processing and making requests and obtaining and processing any responses from servers across a network. The user devices 102A-102D and the server computing devices 110, 120 can each act as a server or client to other server/client devices.

Figure 2:
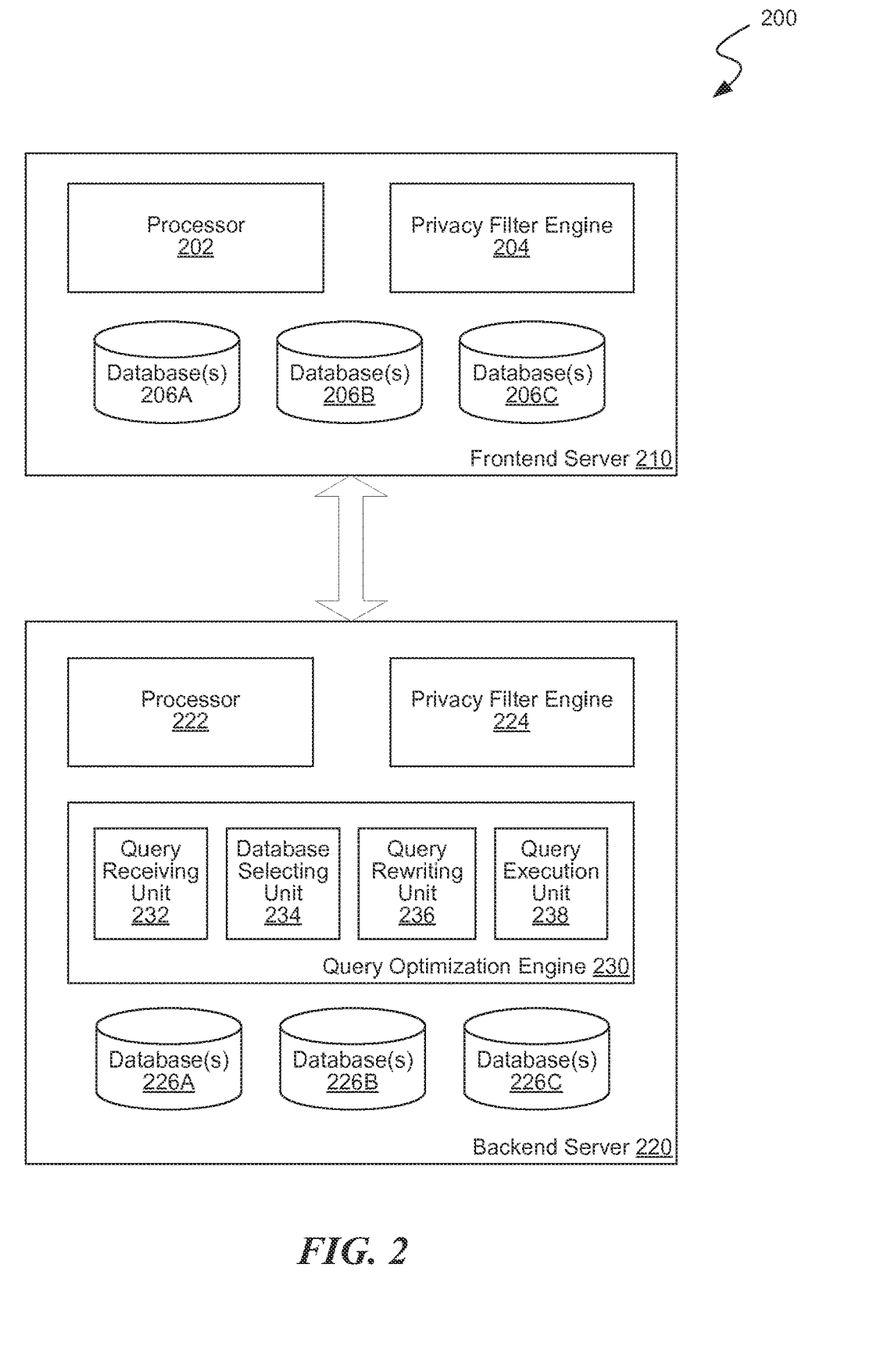

FIG. 2 is a block diagram illustrating a system 200 including a frontend server 210, a backend server 220, and a query optimization engine 230, in accordance with an embodiment. In an embodiment, the system 200 can be part of the environment 100 of FIG. 1. In such embodiment, the frontend server 210 can be similar to the frontend server 110 and the backend server 220 can be similar to the backend server 220.

The frontend server 210 can include a processor 202, a privacy filter 204, and one or more databases 206A-206C. The processor 202 can facilitate the receiving and sending of requests and responses. For example, the processor 202 can receive a request (e.g., a query) from a user device (e.g., a user device 102A of FIG. 1) and redirect the request to the backend server 220 for processing. The privacy filter 204 includes filter logic for performing a privacy check of one or more data items that are retrieved and returned from the backend server 220. Performing the privacy check includes evaluating the data items using a set of privacy policies and rules and determining whether any of the data items should be provided to a viewer based on the evaluation. The privacy filter 204 filters out data items that do not pass the privacy check and returns only the remaining data items that do pass the check to the viewer (e.g., return the data items to a newsfeed of the viewer on the social networking system). The one or more databases 206A-206C can store the set of privacy policies for performing the privacy check. The one or more databases 206A-206C can be local or remote databases. Note that in other embodiments, the frontend server may include more than three databases without deviating from the embodiments disclosed.

The backend server 220 can include a processor 222, a query optimization engine 230, and one or more databases 226A-226C. The processor 222 can facilitate the receiving and sending of requests and responses for the backend server 220. For example, the processor 222 can receive requests from the frontend server 210, parse and/or route requests to other components of the system 200 (e.g., the query optimization engine 230, the databases 226A-C, etc.), aggregate responses from the other components, and send the responses back to the frontend server 210.

In some embodiments, the backend server 220 includes a privacy filter 224. The privacy filter 224 includes filter logic for performing a privacy check of one or more data items that are retrieved and returned from the one or more databases 226A-226C. The backend server 220 can perform the privacy check by communicating with the frontend server 210 to check for a set of privacy policies and rules stored at the one or more databases 206A-206C. In some embodiments, the backend server 220 can receive the set of privacy policies and rules from the frontend server 210 for storage and for performing the privacy check, e.g., at a future time. In some embodiments, the one or more databases 226A-226C can store the set of privacy policies. The privacy filter 224 utilizes the set of privacy policies and rules to evaluate the data items and determine, based on the evaluation, whether any of the data items should be returned to the frontend server 210 for viewing by a viewer. The privacy filter 224 filters out data items that do not pass the privacy check and returns only the remaining data items that do pass the check to the frontend server 210.

The query optimization engine 230 works in coordination with the processor 222 to facilitate the receiving and sending of requests and responses between the frontend server 210 and the backend server 220. The query optimization engine 230 includes a query receiving unit 232, a database selecting unit 234, a query rewriting unit 236, and a query execution unit 238. Note that while FIG. 2 shows the query optimization engine 230 residing at the backend server 220, the query optimization engine 230 may be a part of another server or system in communication with the backend server 220 and the frontend server 210 over a network.

The query receiving unit 232 works with the processor 222 to receive requests for data from the frontend server 210, to parse or analyze the requests, and to route the requests to the database selecting unit 234. The query receiving unit 232 first receives an input query that includes a set of query parameters. An example input query with query parameters (e.g., QP1, QP2, QP3, QP4) can be:

EntPersUser:Alex(userID)→queryFriends( )→query-
Photos( )→SortRecent( )

where:
EntPersUser:Alex(userID) can be denoted as parameter "P1"
queryFriends( ) can be denoted as parameter "P2"
queryPhotos( ) can be denoted as parameter "P3"
SortRecent( ) can be denoted as parameter "P4"

In the example, the query parameters include a "user" parameter ("QP1"), a "friend(s) of user" parameter ("QP2"), a "photos of friend(s)" parameter ("QP3"), and a "sort by recent" parameter ("QP4"). The parameters QP1-QP3 are of "data retrieval" type parameters that specify data items to be retrieved according to the values of the parameters (i.e., "parameter values"). The parameter QP4 is of a "constraint" type parameter that places a constraint on the data retrieved according to the data retrieval parameters. The input query can be, for example, requesting data items for display on a landing page or a news feed with a social networking system.

The query receiving unit 232 analyzes the query parameters of the input query to identify one or more mappings of parameter values. A mapping of parameter values defines an association, or relationship, between at least two or more of the parameter values. In the example above, the query receiving unit 232 can analyze the parameter values to identify a mapping from a user "Alex," to all friends of Alex, to all photos of those friends, and to all recent photos in chronological order from most recent to least recent. More than one mappings may be identified, including, for example: (1) a first mapping "Map A" from Alex, to Alex's friend "Bernie," to friend Bernie's photos; (2) a second mapping "Map B" from Alex, to Alex's friend "Casey," to friend Casey's photos; and (3) a third mapping "Map C" from Alex, to Alex's friends Bernie and Casey, to friend Bernie's photos and friend Casey's photos.

The database selecting unit 234 receives one or more mappings identified by the query receiving unit 232 and identifies one or more databases (e.g., databases 226A-226C) each having an index of data matching the one or more mappings. For example, a database 226A may store a social graph that includes nodes and connecting edges, where the nodes are individual users or entities of a social networking system and the connecting edges are connections, or associations, between the nodes. The social graph can map out, e.g., using an index of data, connections between different sets of data. For example, "Friend:1234" maps to the identifiers (IDs) of all users who are friends with the user having the ID "1234." Using the example above, the database selecting unit 234 can identify that the database 226A is the appropriate, or most optimized, database for executing the query parameters QP1-QP4. Upon identifying such a database, the database selecting unit 234 selects that database and sends the database's identification (e.g., database 226A) to the query rewriting unit 236. In such example, execution of the query parameters at the database 226A is advantageous because the execution can be carried out as one data request, as opposed to four different data requests in a traditional method executing against four traditional databases (e.g., relational databases).

In some instances, there may be two databases each having data that is indexed to a partial mapping of the input query. For example, the database 226B contains data mapped to "Map A" for finding photos of friend Bernie and the database 226C contains data mapped to "Map B" for finding photos of friend Casey. Upon identifying those two databases, the database selecting unit 234 selects them and sends their identifications to the query rewriting unit 236.

The query rewriting unit 236 receives one or more identifications of the database(s) identified by the database selecting unit 234 and proceeds to generate a new query (for each identified database). The new query is customized, or configured, to execute at the database identified (e.g., database 226A). The query execution unity 238 receives the new query from the query rewriting unit 236 and executes that query at the database identified. The query execution unity 238 then returns data items as they are received as a result of the query execution. In some embodiments, the query execution unity 238 sends the resulting data items to the privacy filter engine 224 for a privacy check. In some embodiments, the query execution unity 238, working in coordination with the processor 222, sends the resulting data items to the frontend server 210, which then performs the privacy check using the privacy filter engine 204.

In some embodiments, the database selecting unit 234, the query rewriting unit 236, and the query execution unit 238 work in coordination to execute the query in parallel to return individual sets of data items associated with different users for which data is requested. In the example above, the query receiving unit 232 analyzes that Alex has two friends, Bernie and Casey, whose photos are requested by the query. In such example, the query is executed for Bernie and Casey in parallel. The set of data items associated with Bernie (i.e., Bernie's photos) is returned independently of the set of data items associated with Casey (i.e., Casey's photos). Such parallel execution is advantageous because it allows the data items to be returned more quickly, i.e., as soon as they become available. Details regarding the various embodiments of parallel execution in responding to an input query are further described in the following paragraphs with reference to FIG. 4.

Figure 3:
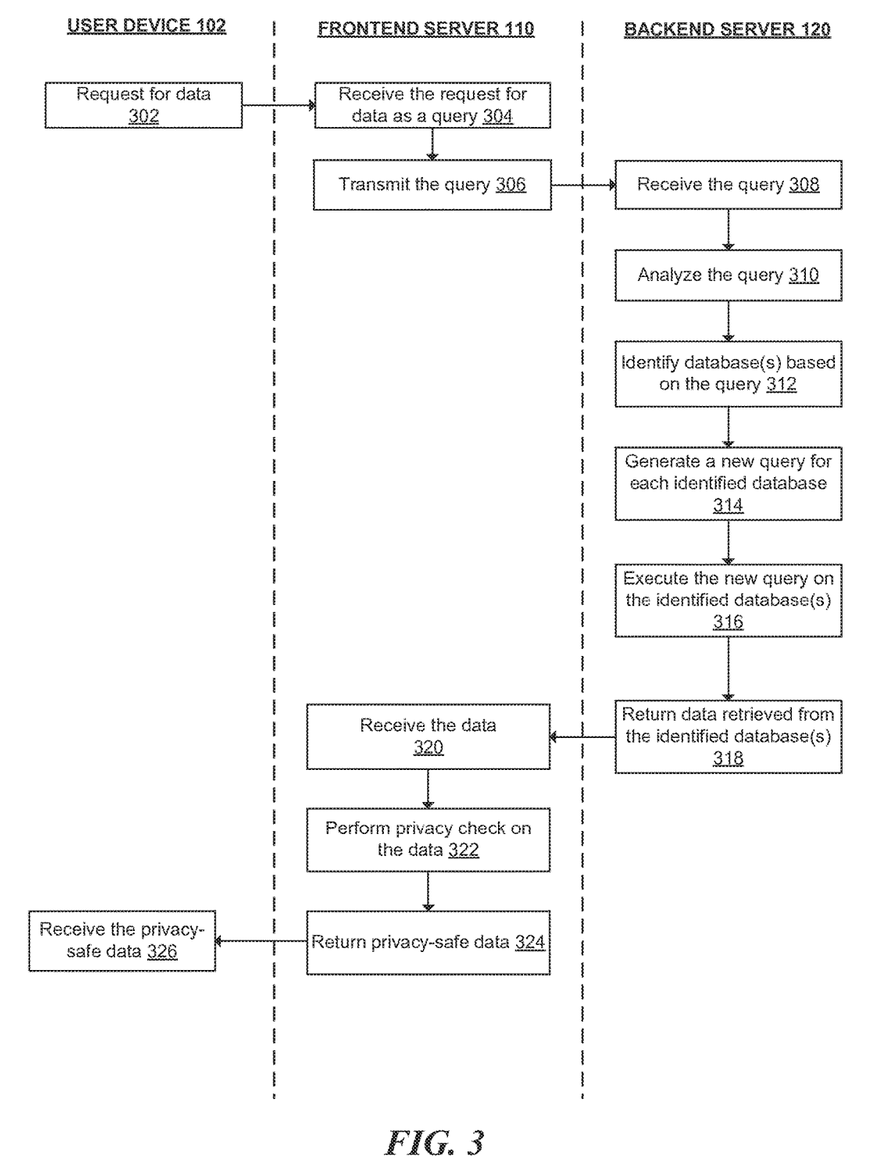
FIG. 3 is a flow diagram illustrating an example process of optimizing execution of a query.

FIG. 3 illustrates an example of a process of optimizing execution of a query in accordance with an embodiment. For purposes of illustration only, the process of FIG. 3 is explained with reference to certain elements illustrated in FIG. 1. The process begins at block 302, in which a user utilizes the user device 102 to request for data to be retrieved and displayed on a landing page of the social networking system (e.g., a news feed, a search page, a data feed, etc.). The request for data can include, for example, a request to view recent photos of the user's friends, a list of the user's friends who are male, 50 most recent photos of the user's friends, etc. For the sake of simplicity, the following description will refer to an example where the request for data is a request for recent photos of all friends of a user "A" on a social networking system, where user A has only one friend, friend "B."

In some embodiments, the user requesting the data is a developer using the social networking system to generate various content for social networking users of the social networking system. In such embodiments, the request for data can be in the form of a query submitted by the developer for execution at a database system associated with the social networking system (e.g., the backend server 120). The query may be submitted using a declarative language to specify the output the developer is seeking, where the developer is not required to understand the embodiments introduced here for optimizing execution of the query specified in the declarative language. In some embodiments, the user requesting the data is a social networking user using the social networking system to view various content offered by the social networking system. In such embodiments, the request for data can be a user input (e.g., a click, a text entry, etc.) submitted to the social networking system through the frontend server 110, which receives and converts the submission into a query for execution at the backend server 120 (e.g., blocks 304-306).

At block 304, the frontend server 110 receives the request submitted by the user at the user device 102 in the form of a query. At block 306, the frontend server 110 transmits the query 306 to the backend server 120 for execution. In some embodiments, the frontend server 110 may indirectly transmit the query to the backend server 120 through one or more intermediary servers, systems, or system components, such as a query optimization engine (e.g., query optimization engine 230). At block 308, the backend server 120 receives the query.

The backend server 120 analyzes the query at block 310 to determine the parameters of the query, i.e., to determine what data items are being requested. For example, the analysis reveals that the query requests the most recent photos of user A be retrieved for viewing. In particular, the backend server 120 may parse the received query to determine the different parameters and the associated parameter values included in the query. The query can include one or more "retrieval" type parameters that specify one or more types of data to be retrieved. An example retrieval type parameter can be "queryFriends( )" that specifies that "friend" entities of a particular social networking user are to be retrieved. The query can include one or more "constraint" type parameters that specify one or more types of constraints to be applied on the data retrieved, such as a "sort" constraint, a "filter" constraint, a "limit" constraint, etc. An example filter constraint parameter can be "FilterFemale( )" that specifies, e.g., the retrieved friends of user A be filtered out to include only female friends. An example sort constraint parameter can be "sortRecent( )" that specifies, e.g., the retrieved friends of user A be sorted in an order of most recent. An example limit constraint parameter can be "limit50( )" that specifies, e.g., the retrieved friends of user A be limited to the first 50 recent photos.

In analyzing the query at block 310, the backend server 120 can also determine one or more mappings between the parameter values associated with the determined parameters. A "mapping" as used here refers to an association or relationship between two or more users, objects, or entities. An example mapping can include an association from entity "user A" to entity "friend" of user A, to entity "photos" of entity "friend", to most recent (e.g., userA:friend:photos_of_friend:sort_recent_photos). In an example where user A has three friends B, C, and D, the mappings can include:

userA:friendB:photos_of_friendB:sort_recent
userA:friendC:photos_of_friendC:sort_recent
userA:friendD:photos_of_friendD:sort_recent As illustrated above, the backend server 120 can analyze the query parameters and associated values to determine the data being requested for the "friend" entities associated with the user A, and to generate multiple mappings, or threads, for the multiple friend entities. These multiple threads can be executed in parallel to deliver individual data sets in a more efficient manner (i.e., to return data as they become available).

At block 312, the backend server 120 identifies a database that is most optimized for the query analyzed at block 310. Whether a particular database is most optimized depends on whether the data indexed at the database corresponds to one or more mappings of the parameter values of the query. For example, a database, which maintains associations between users of the social networking system and associations between those users and their photos chronologically ordered, is optimal for executing the query requesting for recent photos of friend B of user A. In such example, execution of only one data request at the identified database is necessary, as opposed to multiple data requests at different databases, in order to retrieve friend B's most recent photos. Details regarding the embodiment of identifying an optimized database in responding to the query are further described in the following paragraphs with reference to FIG. 4.

At block 314, the backend server 120 generates a new query for the identified database, where the new query is configured to execute at that database. For example, the new query is written in a syntax that corresponds to the structure of the database. At block 316, the backend server 120 executes the new query on the identified database. At block 318, one or more data items are retrieved from the database and returned as a result of the execution. For example, 50 recent photos of friend B are retrieved and returned. In the embodiment of FIG. 3, the one or more data items are returned to the frontend server 110. In some embodiments, however, the one or more data items may reside at the backend server 120 for a privacy check before being returned to the frontend server 110.

At block 320, the frontend server 110 receives the data (e.g., all recent photos of friend B) returned from the backend server 120. At block 322, the frontend server 110 performs a privacy check on the data. Performing the privacy check can include evaluating the privacy settings specified, for example, by friend B for the recent photos retrieved and determining whether to filter out certain photos based on the evaluation. In particular, the frontend server 110 determines, for example, whether the viewing user associated with the query (e.g., a social networking user who will be viewing the photos on a newsfeed) is permitted to view each of the recent photos retrieved. Photos that do not pass the privacy check are removed from the set of photos to be returned. At block 324, the frontend server 110 returns privacy-safe data to the user device 102, e.g., a set of photos the viewing user is permitted to view. At block 326, the user device 102 receives the privacy-safe data as a return to the request for data submitted at block 302.

Figure 4:
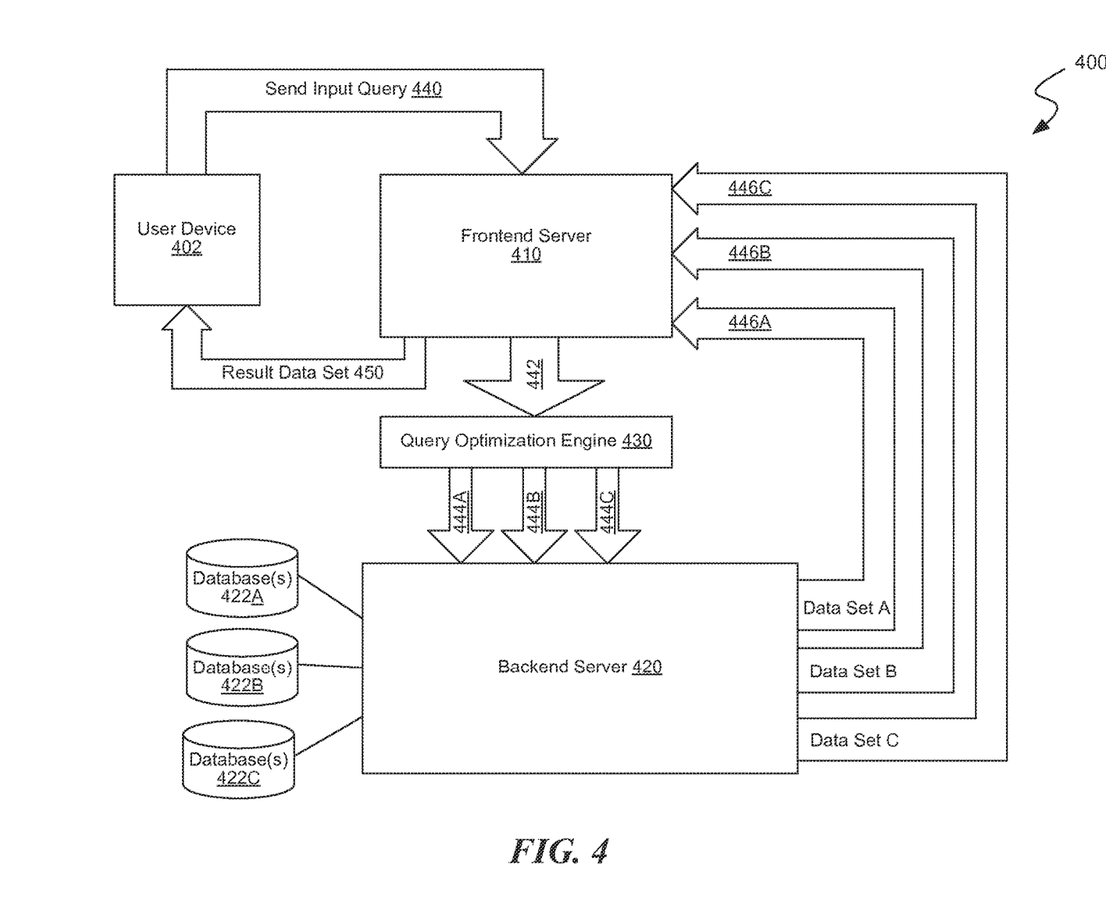
FIG. 4 is a data flow diagram illustrating an example process of optimizing execution of a query.

FIG. 4 is a data flow diagram illustrating an example process of optimizing execution of a query at a social networking system, in accordance with an embodiment. In one embodiment, the social networking system can be similar to the social networking system 106 of FIG. 1. Referring to FIG. 4, the process 400 involves interactions between a user device 402, a frontend server 410, a backend server 420, one or more databases 422A, 422B, 422C, and a query optimization engine 430. In one embodiment, the user device 402 can be similar to the user device 102 of FIG. 1, the frontend server 410 can be similar to the frontend server 110 of FIG. 1, and the backend server 420 can be similar to the backend server 120 of FIG. 1. In one embodiment, the one or more databases 422A 422B, 422C can be similar to the databases 140 of FIG. 1 or the databases 226A, 226B, 226C of FIG. 2. In one embodiment, the query optimization engine 430 can be similar to the query optimization engine 230 of FIG. 2.

Figure 5:
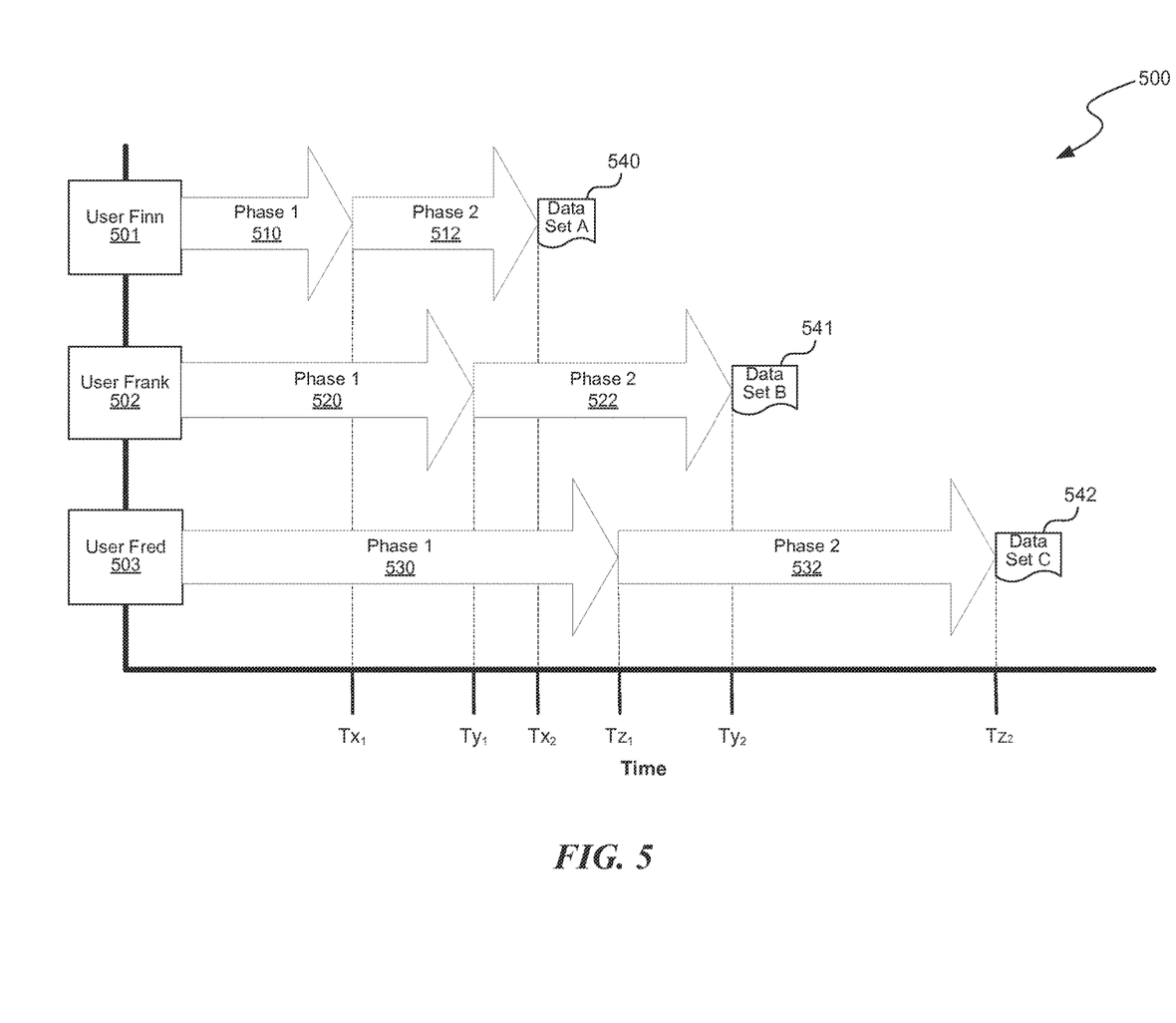
FIG. 5 is flow diagram illustrating a process of obtaining individual data items of a query result set for a query.

For ease of understanding, discussion of the process 400 of FIG. 4 will be in conjunction with FIG. 5. FIG. 5 is flow diagram illustrating a process 500 of obtaining individual data items of a query result set for the query of FIG. 4. The process 400 starts with the user device 402 submitting an input query (i.e., block 440) to a frontend server 410 of the social networking system. The input query can be specified in a declarative language to indicate that data being requested. The following description will refer to the example input query as follows:

EntPersUser:Bernice(userID)→
    queryFriends( )∧queryPhotos( )→FilterMostLiked( )

where:
EntPersUser:Bernice(userID) can be denoted as parameter "P1"
queryFriends( ) can be denoted as parameter "P2"
queryPhotos( ) can be denoted as parameter "P3"
FilterMostLiked( ) can be denoted as parameter "P4"

The input query (as shown above) specifies in a declarative language four different query parameters P1, P2, P3, and P4, each requesting data associated with a particular parameter value, where P1-P3 are data retrieval type parameters and P4 is a constraint type parameter. P1 requests for the user identifier (ID) of a user "Bernie" (i.e., parameter value of P1) to be retrieved from a first database. The parameter value of P1 is "Bernie." P2 requests for the user IDs of Bernie's friends to be retrieved from a second database, which may be the same database as the first database. The parameter value of P2 is "friends of Bernie." P3 requests for the photo IDs of each of Bernie's friends to be retrieved from a third database, which may or may not be the same database as the first or second database. The parameter value of P3 is "photos of friends of Bernie." P4 requests for the most liked photos out of all of the photos retrieved. In some embodiments, the most liked photos may be already stored in a fourth database and may be retrieved from that database, which may or may not be the same database as the first, the second, or the third database. For example, the fourth database is a database containing indexed data of most liked photos for users of the social networking system). In some embodiments, the most liked photos may be filtered by logic based on data associated with each photo (e.g., embedded metadata). Execution of the above example query can be represented as follows:

Traditional System/Method: $\overline{S_u}\ \sigma_p\ \overline{\pi_f}\ \ \sigma_p\ \overline{\pi_p}\ \sigma_p$
Introduced System/Method: $\overline{S_u\ \pi_f\ \pi_p\ \theta_t}\ \ \sigma_p\ \sigma_p\ \sigma_p$ where $S_u$ is the user source, $\pi_f$ is the request for friends, $\pi_p$ is the request for photos, $\theta_t$ is the sorting by time, and $\sigma_p\ \sigma_p\ \sigma_p$ are the privacy checks Under the traditional embodiments, execution of the example query may include execution of three different data requests, or sub-queries, to retrieve and return the result data set to the example query. Further, under the traditional approach, a privacy check is applied after each data request, or sub-query, is executed, resulting in multiple hops between the frontend server 410 and the backend server 420.

Consider the example where the user Bernie has three friends named "Finn," "Frank," and "Fred." Bernie and his three friends can each have different privacy settings to indicate who can view each person's photos (e.g., public, friends, or only some users). Accordingly, execution of the example query would include several operations that "hop" between the frontend server 410 and the backend server 420, where different data portions need to be aggregated from the backend server 420 and returned to the frontend server 410 for privacy evaluation.

A first round of the query execution includes a hop to the backend server 420 to fetch Bernie's user ID and a hop to the frontend server 410 to return the user ID for a privacy check. The privacy check determines whether a viewer of the requested data items (e.g., recent, most liked photos of Bernie's friends) is permitted to view content belonging to Bernie (e.g., Bernie's friends). The resulting data portion of the first round (i.e., Bernie's user id) is fed as input to perform a second round of the query execution. The second round includes several hops to fetch the user ids of Bernie's friends from the backend server 420 and to return those user ids for a privacy check at the frontend server 410. In particular, the privacy check determines whether the viewer is able to view the entities (i.e., photos) of Finn, of Frank, and of Fred.

The resulting data portions of the second round (i.e., Finn's user id, Frank's user id, and Fred's user id) are then fed as inputs to perform a third round of the query execution. In the third round, several hops occur for each friend's user id to fetch the respective photos of each friend from the backend server 420. Each set of photos belonging to Finn, Frank, and Fred, respectively, may reside on different databases of the backend server 420. As such, it may take a significant amount of time to identify the appropriate database and to fetch the data (as some databases may take longer than others). Once the sets of photos are aggregated and fetched from different databases at the backend server 420, an additional hop needs to occur to return each set to the frontend server 410 for a privacy check. The privacy check determines whether the viewer is able to view all photos in each set with respect to the set owner's privacy settings (e.g., Finn's, Frank's, or Fred's). In the scenario that only a few photos pass the privacy check, significant time and resources will have been wasted for fetching all of the photos of the three friends. Lastly, the frontend server 410 have to filter the privacy-compliant photos according to most liked photos. In the scenario that only a few photos (of the already small number of privacy-compliant photos) are liked, additional time and resources will have been wasted.

In contrast, under the disclosed embodiments, the multiple data requests of the query are executed as one data request, the sorting is performed as part of the data request, and the multiple privacy checks are applied at the end of the query execution (as opposed to being applied intermittently in between the data requests). Further, where multiple threads exist within a query execution, e.g., data to be retrieved from multiple users, the embodiments execute the multiple threads in parallel, as opposed to waiting for each thread to finish before continuing onto the next thread (e.g., as illustrated in process 500).

In accordance with the disclosed embodiments, upon receiving the input query at block 440, the front end server 410 sends the query to the query optimization engine 430, as indicated in block 442. The query optimization engine 430 analyzes the parameters (e.g., P1-P4) to determine (a) one or more mappings of parameter values associated with the parameters and (b) one or more users for which to retrieve corresponding sets of data based on the mappings. A determination of the users provides an indication of a number of execution threads needed to satisfy the parameters of the query.

For the example query, the query optimization engine 430 determines a mapping "X" that includes the association "Bernice:Friends:Photos:MostLiked." More than one mappings may be determined. For example, a mapping for each friend of Bernie may be generated, including:

mapping "F1"—"Bernice:Finn:Photos:MostLiked"
mapping "F2"—"Bernice:Frank:Photos:MostLiked"
mapping "F3"—"Bernice:Fred:Photos:MostLiked"

The query optimization engine 430 then communicates with the backend server 420 to identify one or more databases corresponding to one or more mappings determined by the query optimization engine 430. In an example where Bernice has three friends, the query optimization engine 430 works with the backend server 420 to execute three threads in parallel for the three friends. In particular, the query optimization engine 430 may send three separate mappings (e.g., F1, F2, and F3) to request the backend server to identify a database for each mapping, as indicated by blocks 444A, 444B, and 444C. For example, the database 422A may be identified as having data that corresponds to mapping F1, the database 422B may be identified as having data that corresponds to mapping F2, and the database 422C may be identified as having data that corresponds to mapping F3, where each database contains social graph information with associations between users (e.g., friendships) and most liked photos associated with those users. In some embodiments, the query optimization engine 430 resides at the backend server 420 to perform the mapping and database identification.

Upon the database identification, the backend server 420 facilitates the retrieving of individual data sets (e.g., photos) for the three friends according to the mappings of the parameters values. Using the above example, three new queries, or sub-queries of the input query, are generated and executed in parallel at the three database 422A, 422B, 422C to retrieve the individual data sets. The individual data sets are then returned to the frontend server 410, as indicated in block 446A-446C. The frontend server 410 performs a privacy check on each individual data set returned to the server 410. In some embodiments, the privacy check is performed at the backend server 420.

As illustrated in the process 500 of FIG. 5, the different parameters of the input query may be executed in parallel for parameter values "Finn," "Frank," and "Fred." Execution of the different parameters may be divided into phases based on the type of parameter and whether a particular identified database is able to perform the operation associated with the parameter. Each phase can include execution of a subset of the parameters of the input query. A first subset can be executed at a particular database having an index of data that corresponds to a mapping of the values associated with the first subset of parameters. A second subset can be executed on a result data set of the first subset. As briefly discussed above, the first and second subsets for the different friends can be executed in parallel, such that individual data sets are returned to the input query as soon as they become available, independent of the remaining individual data sets.

The query optimization engine 430 can determine which parameters of the query are to be included in the subsets, and in which phase. In particular, the query optimization engine 430 can determine whether to execute constraint type parameters (e.g., "Filters," "Sorts," and "Limits") associated with a particular input query in either (a) the frontend server 410 or (b) at the backend server 420, depending on which server is better suited for handling a particular operation.

Referring to FIG. 5, in some embodiments, "Phase 1" can represent a phase in which the data retrieval parameters (e.g., P1-P3) and the constraint parameter (e.g., P4) are executed as one query, or sub-query of the input query, directed at an identified database. In such embodiment, instead of retrieving, or fetching, the data items from the identified database and then executing the constraint parameter, both operations can be included as one request directed at the identified database. This can be done when the query optimization engine 430 is able to identify a database with a data structure corresponding to a particular mapping of all of the parameter values in the query. Such implementation is advantageous in that it allows reduction of memory usage by having the identified database execute the constraint parameter (e.g., filter). Further, according to such embodiments, "Phase 2" can represent a phase in which the backend server 420 performs a privacy check on the retrieved result data set (e.g., most liked photos of user Finn).

In some embodiments, Phase 1 can represent a phase in which only the data retrieval parameters are executed, and Phase 2 can represent a phase in which the constraint parameter is executed (e.g., filter). In such embodiments, the privacy check can be executed at a later time, e.g., at the frontend server 410 once the result data set is returned at block 446. In some embodiments, the privacy check can be performed along with execution of the constraint parameter at the backend server 420 in Phase 2. For ease of discussion, the following discussion of FIG. 5 will focus on Phase 1 including only execution of the data retrieval parameters and Phase 2 including execution of the constraint parameter.

At Phase 1, the multiple data requests specified by the data retrieval parameters (e.g., P1, P2, P3) are aggregated into one data request (or query) directed at one identified database. The data request retrieves and aggregates, from the identified database, data items satisfying the parameters for each individual data set of a respective friend (e.g., Finn, Frank, and Fred). At Phase 2, the aggregated data items of each individual data set (e.g., data sets 549, 541, or 542) are filtered, where Phase 2 can start whenever Phase 1 is complete for the respective friend. For example, Phase 2 can start at time $Tx_1$ for user Finn, without having to wait until time $Ty_1$ or time $Tz_1$. The parallel execution of the disclosed embodiments is advantageous in that the individual data sets (e.g., data sets 540-542) can be returned, e.g., to the news feed page, as soon as each set becomes available. In contrast, under traditional embodiments, Phase 2 for user Finn, for example, cannot start until time $Tz_1$ when Phase 1 has completed for both users Frank and Fred. Further, the privacy-compliant, most liked photos of all of the friends cannot be returned to the news feed page until time $Tz_2$, when Phases 1 and 2 are complete for all friends.

Figure 6:
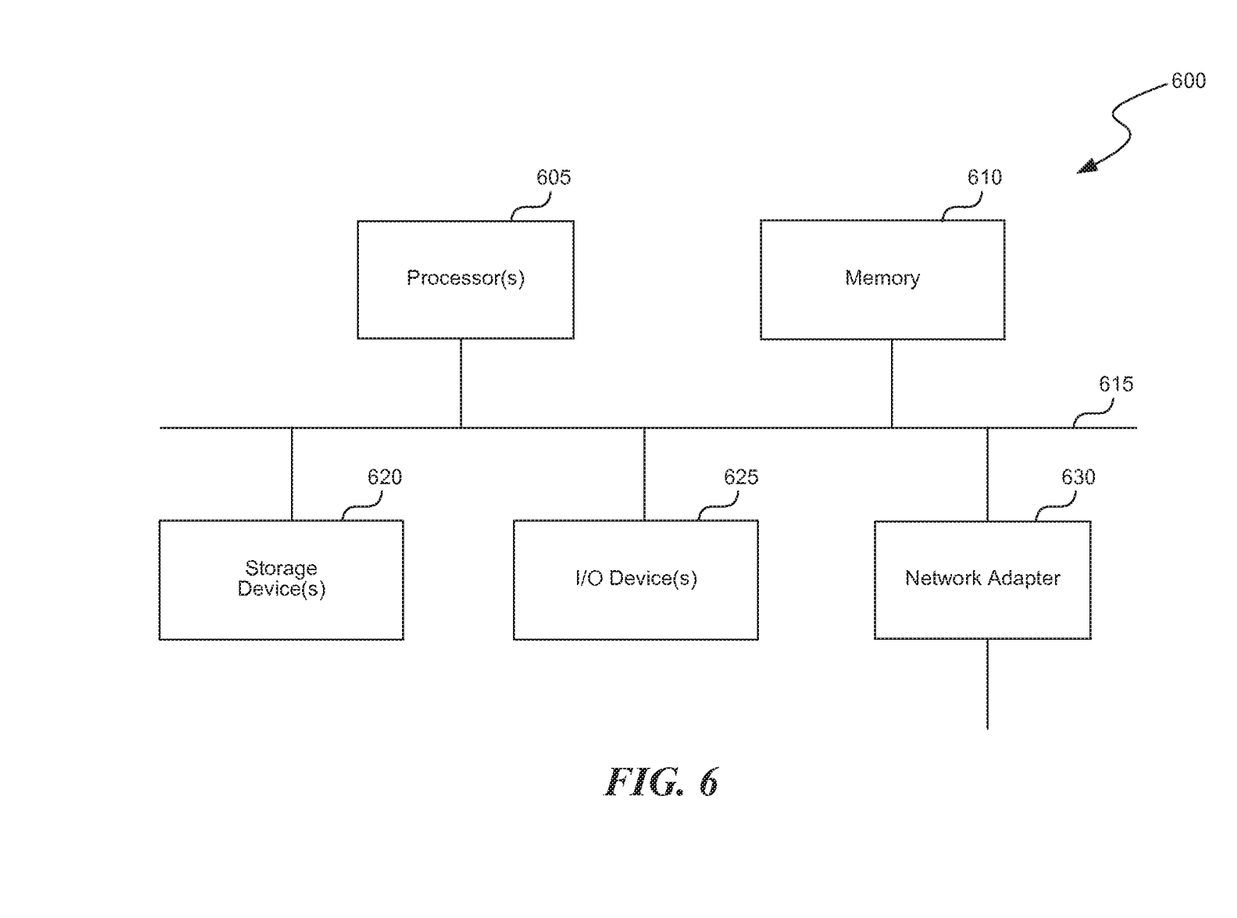
FIG. 6 is a block diagram of a computer processing system that can perform any one or more of the methodologies discussed herein.

FIG. 6 is a block diagram of an apparatus that may perform various operations, and store various information generated and/or used by such operations, according to an embodiment of the disclosed embodiments. The apparatus can represent any computer or processing system described herein. The processing system 600 is a hardware device on which any of the entities, components or services depicted in the examples of FIGS. 1-5 (and any other components described in this specification) can be implemented, such as the privacy filter engine, the query optimization engine, the query receiving unit, the database selecting unit, the query rewriting unit, the query execution unit, etc. The processing system 600 includes one or more processors 605 and memory 610 coupled to an interconnect 615. The interconnect 615 is shown in FIG. 6 as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 605 is/are the central processing unit (CPU) of the processing system 600 and, thus, control the overall operation of the processing system 600. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 610 is or includes the main memory of the processing system 600. The memory 610 represents any form of random access memory (RAM), read-only memory (ROM), flash memory, or the like, or a combination of such devices. In use, the memory 610 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 605 through the interconnect 615 are a network adapter 630, a storage device(s) 620 and I/O device(s) 625. The network adapter 630 provides the processing system 600 with the ability to communicate with remote devices, over a network and may be, for example, an Ethernet adapter or Fibre Channel adapter. The network adapter 630 may also provide the processing system 600 with the ability to communicate with other computers within the cluster. In some embodiments, the processing system 600 may use more than one network adapter to deal with the communications within and outside of the cluster separately.

The I/O device(s) 625 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 610 can be implemented as software and/or firmware to program the processor(s) 605 to carry out actions described above. In certain embodiments, such software or firmware may be initially provided to the processing system 600 by downloading it from a remote system through the processing system 600 (e.g., via network adapter 630).

The disclosed embodiments can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the disclosed embodiments may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 620 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method for retrieving data stored in a server system comprising a frontend server and a backend server, the method comprising:
   receiving, at the frontend server, a user request to retrieve individual data sets of multiple entities associated with a user from a user device associated with the user;
   parsing, by the frontend server, the user request to generate an input query, the input query including a set of query parameters;
   receiving, at the backend server, the input query;
   analyzing, by the backend server, the set of query parameters to identify multiple mappings of parameter values associated with the set of query parameters, wherein a first mapping of the multiple mappings includes a first set of the parameter values corresponding to a first entity of the multiple entities, wherein a second mapping of the multiple mappings includes a second set of the parameter values corresponding to a second entity of the multiple entities;
   retrieving, in parallel based on the multiple mappings by the backend server, the individual data sets for at least some of the multiple entities, said retrieving including:
      generating, from the input query, a first query based on the first mapping and a second query based on the second mapping, the first query to obtain a first individual data set corresponding to the first entity, the second query to obtain a second individual data set corresponding to the second entity;
      identifying a database of the server system having an index that matches the first mapping and the second mapping,
      executing the first query and the second query at the identified database in parallel, wherein the executing includes:
         determining a retrieval type parameter associated with the input query and a constraint type parameter associated with the input query,
         determining a retrieval type parameter value and a constraint type parameter value from the first set of the parameter values,
         determining a first phase and a second phase based on the retrieval type parameter, the constraint type parameter, and whether the identified database of the server system is able to perform one or more operations associated with the retrieval type parameter and the constraint type parameter,
         executing, in the first phase, a first portion of the first query with the retrieval type parameter value to retrieve the first individual data set, and
         executing, in the second phase, a second portion of the first query with the constraint type parameter value to apply a constraint on the first individual data set retrieved in the first phase, wherein the second portion of the first query is executed even if a first portion of the second query is still under execution, and
      returning, from the backend server to the frontend server, based on said executing, the first individual data set and the second individual data set;
   applying, by the frontend server, a privacy setting to the first individual data set and the second individual data set to determine whether to deny outputting the first individual data set and the second individual data set; and
   sending, from the frontend server to the user device responsive to the user request, the first individual data set and the second individual data set upon determining not to deny outputting the first individual data set and the second individual data set.

2. The method of claim 1, wherein executing the input query at the identified database comprises:
   generating a customized query based on the input query, the customized query configured to execute at the identified database;
   and executing the customized query at the identified database.

3. The method of claim 1, wherein the set of query parameters is specified using a declarative language.

4. The method of claim 1, wherein the constraint type parameter value corresponds to any one of a sort parameter, a filter parameter, or a limit parameter.

5. The method of claim 1, wherein applying the privacy setting comprises:
   filtering out a subset of the first individual data set that is denied based on the privacy setting; and
   outputting remaining subsets of the first individual data set that are not denied based on the privacy setting.

6. A computer-readable storage medium storing computer-readable instructions, comprising:
   instructions for parsing a user request to generate an input query specifying query parameters;
   instructions for analyzing the query parameters specified in the query, the query parameters including a first set of parameter values and a second set of parameter values;
   instructions for identifying a database having a data index that corresponds to values associated with the query parameters;
   instructions for generating a first customized query and a second customized query based on the query, the first customized query to obtain a first data set based on the first set of parameter values, the second customized query to obtain a second data set based on the second set of parameter values;

instructions for executing, at the database and in parallel, the first customized query and the second customized query to retrieve the first data set and the second data set, wherein the instructions for executing include:

instructions for determining a retrieval type parameter associated with the input query and a constraint type parameter associated with the input query, instructions for determining a retrieval type parameter value and a constraint type parameter value from the first set of the parameter values, instructions for determining a first phase and a second phase based on the retrieval type parameter, the constraint type parameter, and whether the identified database of the server system is able to perform one or more operations associated with the retrieval type parameter and the constraint type parameter, instructions for executing, in the first phase, a first portion of the first customized query with the retrieval type parameter value to retrieve the first data set, and instructions for executing, in the second phase, a second portion of the first customized query with the constraint type parameter value to apply a constraint on the first data set retrieved in the first phase, wherein the second portion of the first customized query is executed even if a first portion of the second customized query is still under execution; and instructions for sending the first data set and the second data set as a data result set to the query, wherein the first data set and the second data set are returned to the query in parallel independently of each other.

7. The computer-readable storage medium of claim 6, further comprising:

instructions for applying a privacy setting to the first data set being returned to the query, the privacy setting specifying whether a user associated with the query is denied access to the first data set.

8. The computer-readable storage medium of claim 7, wherein applying the privacy setting comprises:

filtering out a subset of the first data set that is denied based on the privacy setting; and outputting remaining subsets of the first data set that are not denied.

9. The computer-readable storage medium of claim 6, wherein the query parameters comprise: a data retrieval parameter for retrieving a first specified data set; and a data constraint parameter for applying a constraint on the first specified data set to generate a second specified data set.

10. The computer-readable storage medium of claim 9, wherein the query parameters include an optimized retrieval parameter for retrieving a constrained data set, the constrained data set being the second specified data set with the constraint applied.

11. The computer-readable storage medium of claim 9, wherein the data constraint parameter comprises any one of a sort parameter, a filter parameter, or a limit parameter.

12. The computer-readable storage medium of claim 6, wherein the query parameters are specified using a declarative language.

13. A system for executing a request to retrieve data from a database of a social networking system, comprising:

a frontend server configured to:

receive, the request to retrieve individual data sets of multiple entities associated with a user from a user device associated with the user; and parse the request to generate an input query, the input query including a set of query parameters;

a backend server configured to:

receive the input query;

analyze the set of query parameters to identify multiple mappings of parameter values associated with the set of query parameters, wherein a first mapping of the multiple mappings includes a first set of the parameter values corresponding to a first entity of the multiple entities, wherein a second mapping of the multiple mappings includes a second set of the parameter values corresponding to a second entity of the multiple entities;

retrieve the individual data sets of the multiple entities in parallel based on the multiple mappings, said retrieving including:

generating, from the input query, a first query based on the first mapping and a second query based on the second mapping, the first query to obtain a first individual data set corresponding to the first entity, the second query to obtain a second individual data set corresponding to the second entity, executing the first query and the second query at a database in parallel, wherein the executing includes:

determining a retrieval type parameter associated with the input query and a constraint type parameter associated with the input query, determining a retrieval type parameter value and a constraint type parameter value from the first set of the parameter values, determining a first phase and a second phase based on the retrieval type parameter, the constraint type parameter and whether the identified database of the server system is able to perform one or more operations associated with the retrieval type parameter and the constraint type parameter, executing, in the first phase, a first portion of the first query with the retrieval type parameter value to retrieve the first individual data set, and executing, in the second phase, a second portion of the first query with the constraint type parameter value to apply a constraint on the first individual data set retrieved in the first phase, wherein the second portion of the first query is executed even if a first portion of the second query is still under execution, returning, to the frontend server, based on said executing, the first individual data set and the second individual data set; and the frontend server configured to:

receive, in parallel, the individual data sets retrieved by the backend server; and apply, in parallel, a privacy check to the individual data sets to determine whether to deny outputting a subset of the individual data sets based on a privacy setting; and send, from the frontend server to the user device, the subset of the individual data set upon determining not to deny outputting the subset of the individual data set.

14. The system of claim 13, wherein the privacy setting specifies whether the user is permitted to view the subset of the individual data sets.

15. The system of claim 13, wherein the frontend server is further configured to:
  filter out the subset of the individual data sets that is denied.

16. The system of claim 13, wherein the frontend server is further configured to output remaining subsets of the individual data sets that are not denied to a computing device associated with the user.

17. The system of claim 13, wherein the set of query parameters comprise a first data retrieval parameter for retrieving a first data set, and a data constraint parameter for applying a constraint on the first data set.

18. The system of claim 17, wherein the data constraint parameter comprises any one of a sort parameter, a filter parameter, or a limit parameter.

* * * * *